United States Patent [19]

Hashimoto et al.

[11] Patent Number: 5,003,403
[45] Date of Patent: Mar. 26, 1991

[54] RECORDING APPARATUS

[75] Inventors: Seiji Hashimoto, Kanagawa; Tsuguhide Sakata, Tokyo; Akihiko tojo, Kanagawa, all of Japan

[73] Assignee: Canon Kabushiki Kaisha

[21] Appl. No.: 344,537

[22] Filed: Apr. 24, 1989

Related U.S. Application Data

[63] Continuation of Ser. No. 164,063, Mar. 3, 1988, abandoned, which is a continuation of Ser. No. 751,068, Jul. 2, 1985, Pat. No. 4,746,992.

[30] Foreign Application Priority Data

| Jul. 3, 1984 | [JP] | Japan | 59-138252 |
| Jul. 3, 1984 | [JP] | Japan | 59-138253 |
| Jul. 3, 1984 | [JP] | Japan | 59-138254 |
| Jul. 3, 1984 | [JP] | Japan | 59-138255 |

[51] Int. Cl.$^5$ .......................... H04N 5/76; H04N 9/79
[52] U.S. Cl. .................................................. 358/310
[58] Field of Search ............... 358/310, 312, 330, 329, 358/21 R, 335, 39, 40, 327, 328, 334; 360/10.1, 13, 33.1, 35.1, 9.1, 14.1, 18, 24, 29, 30

[56] References Cited

U.S. PATENT DOCUMENTS

| 4,100,567 | 7/1978 | Yoshinaka | 358/324 |
| 4,178,606 | 12/1979 | Hirota | 358/328 |
| 4,242,699 | 12/1980 | Kobayashi et al. | 358/329 |

Primary Examiner—Robert L. Richardson
Attorney, Agent, or Firm—Toren, McGeady & Associates

[57] ABSTRACT

A reproducing apparatus wherein luminance signals are converted by a first conversion process into converted luminance signals, while color information signals are converted by a second conversion process into converted color information signals, both signals then being multiplexed to form color video signals which are recorded on a record bearing medium. The color video signals are reproduced from the record bearing medium, and the converted luminance signals and the converted color information signals are separated from the reproduced video signals. A first inverse-conversion process inverse to the first conversion process is applied to the separated converted luminance signals to form luminance signals, while a second inverse-conversion process inverse to the second conversion process is applied to the separated converted color information signals to form color information signals, and the signals are separately output to other external devices. This construction allows the color video signals reproduced from the record bearing medium to be supplied to external devices without deterioration.

28 Claims, 8 Drawing Sheets

RECORDING APPARATUS

This is a continuation application of U.S. patent application Ser. No. 07/164,063, filed Mar. 3, 1988, now abandoned which in turn is a continuation application of U.S. patent application Ser. No. 06/751,068, filed July 2, 1985 now U.S. Pat. No. 4,746,992.

BACKGROUND OF THE INVENTION

1. Field of the Invention

This invention relates to a reproducing apparatus which excels in dubbing characteristics.

2. Description of the Prior Art

Still picture video recording systems (hereinafter will be called SV systems) are known which record still picture video signals on a magnetic disc or the like. The magnetic disc, which is employed as the information recording medium for the SV system, has, for example, a luminance signal recorded within a high zone and a color signal recorded within a low zone in a color-difference line sequence, as shown in FIG. 1 of the accompanying drawings, in a frequency spectrum either in the form of field recording covering just one field or in the form of frame recording covering two fields.

In a reproducing apparatus, therefore, the color signal must be interpolated to have line sequential color difference signals converted into concurrent color difference signals. Further, in the case of field recording, the signal must be converted into a frame signal for the purpose of having an interlace display at a monitor. For the conversion, interpolation is generally carried out by averaging horizontal line signals. This method is highly advantageous as it gives an improved resolution at the monitor.

In case of dubbing, however, the above-stated interpolating method degrades the resolution, because: in the format of a standard SV system, the line sequential color difference signals ($B-Y$ and $R-Y$) are allowed to have an arbitrary phase in the odd- and even-number fields; further, in the case of field recording, the signal is allowed to be recorded in either an odd-number field or an even-number field. This shortcoming of the prior art is further described with reference to FIGS. 2A and 2B as follows:

In FIGS. 2A and 2B, the illustrations include 0.5 H delay (DL) circuits 1 and 4, with reference symbol H denoting a horizontal line period; switch circuits SW1 to SW4; and 1 H delay circuits 2, 5 and 6. These circuits are disposed within an output circuit of a reproducing apparatus which will be described later herein.

FIG. 2A shows a luminance (Y) signal interpolation circuit. The switches SW1 and SW2 are arranged to be switched over every field. Accordingly, the input Y signal is produced in a state of having been delayed by 1 H (horizontal period) for a first field. For a next field, the Y signal is skew compensated by the 0.5 H delay circuit 1 and is then averaged with the input and output signals of the next 1 H delay circuit 2 used. As a result, an interpolation signal which is delayed by 1.5 H is produced from the luminace (Y) signal interpolation circuit.

FIG. 2B shows a color (C) signal interpolation circuit. In this circuit, the switch SW3 and the 0.5 H delay circuit 4 are provided for the purpose of skew compensation. The 1 H delay circuits 5 and 6 and the switch SW4 are provided for changing the line sequential color difference signals into concurrent signals. More specifically, the incoming line sequential signals include $R-Y$ and $B-Y$ signals for every H period. Therefore, another color difference signal which does not include them is made into concurrent signals by averaging (interpolating) 0 H and 2 H signals. Therefore, the concurrent color difference signals become:

$R-Y$: 1 H, ½ (0 H+2 H), 1 H $B-Y$: ½ (0 H+2 H), 1 H, ½ (0 H+2 H)

Thus, one of the color difference signals is always produced as an interpolated concurrent signal. Therefore, during the process of dubbing the luminance signal, the interpolated signal might be dubbed in reproducing the information which has been field recorded while, for the color signal, the interpolated color difference signal will be always dubbed. With the dubbing repeated, therefore, the vertical resolution degrades in proportion to the number of repeating times of dubbing. In the event of horizontal interpolation, the horizontal resolution is likewise degraded.

Further, in having information recorded on a magnetic disc dubbed to another disc, there arises the following problem of time base variations: A time base variation caused by a motor and a time base variation caused by variations in loads on the disc and a magnetic head result in a small picture distortion in the horizontal direction of a reproduced picture. At present, this is corrected by the AFC characteristic of the display. However, if the time base variations become excessive according as the dubbing is repeated, the correction becomes no longer possible.

Another problem of the prior art resides in that in the magnetic conversion system of the reproducing apparatus, the S/N ratio of a reproduced modulated signal is deteriorated by an AM noise resulting from a slight difference in touch between the magnetic disc and the magnetic head, a sliding noise, the thermal noise of the magnetic head, a modulation noise, etc.

It is a further problem of the prior art that there takes place deterioration of a high frequency characteristic mainly in the recording and reproducing system including the magnetic disc and the magnetic head.

SUMMARY OF THE INVENTION

It is a principal object of this invention to provide a reproducing apparatus which is capable of obviating the above-stated shortcomings of the prior art.

A more specific object of the invention is to provide a reproducing apparatus which is capable of minimizing deterioration of resolution.

It is another object of this invention to provide a dubbing apparatus and a method for forming a dubbing signal which are capable of obviating the above-stated shortcomings of the prior art.

It is another specific object of the invention to provide a dubbing apparatus and a method for forming a dubbing signal which are capable of obviating the above-stated shortcomings of the prior art.

It is a further object of the invention to provide a dubbing apparatus and a dubbing signal forming method which are adapted for simplification of correction of signal deterioration in carrying out dubbing.

To attain these objects, a reproducing apparatus which is arranged according to this invention is provided with: A head which is arranged to read out a video signal from a recording medium; interpolation means for interpolating the video signal read out from the head; interpolation signal producing means for producing a signal obtained through the interpolation means; dubbing signal producing means for producing to the outside of the reproducing apparatus, as a dubbing signal, a video signal which is read out by the head but is not processed through the interpolation means. The reproducing apparatus which is arranged in this manner is capable of preventing deterioration of resolution in carrying out dubbing, so that a dubbing signal of high quality can be recorded.

A dubbing apparatus which is arranged as another embodiment of this invention is provided with: demodulation means for demodulating a modulated video signal read out from a recording medium; interpolation means for carrying out an interpolation process on the output of the demodulation means; interpolation signal producing means for producing a signal obtained through the interpolation means; modulation means for modulating the output of the demodulation means obtained without being processed through the interpolation means; and dubbing signal producing means for producing the output of the modulation means to the outside of the dubbing apparatus as a dubbing signal. Such being the arrangement of the embodiment, deterioration of resolution can be prevented at the time of dubbing to permit recording of a dubbing signal of high quality. Since the dubbing signal is formed by demodulating the signal obtained from the recording medium and by modulating it after demodulation without having any interpolation process carried out thereon, the dubbing signal can be prevented from deteriorating. Therefore, various correction processes such as time correction and a waveform treating process, can be simply carried out.

A reproducing apparatus which is arranged as another embodiment of the invention is provided with: dubbing signal producing means which is arranged to demodulate modulated line sequential color difference signals read out from a recording medium and to produce them as a dubbing signal; and discrimination signal producing means which is arranged to form and produce a discrimination signal corresponding to each of the line sequential color difference signals. With the reproducing apparatus being arranged in this maner, a dubbing signal thus obtained permits the reproduced line sequential color difference signals to be accurately dubbed to give a high quality picture.

A reproducing apparatus which is arranged as a further embodiment of the invention is provided with: demodulation means for demodulating a modulated video signal read out from a recording medium; interpolation means which is arranged to periodically form a vertical interpolation signal by using the above-stated video signal; and discrimination signal producing means which is arranged to produce to the outside of the reproducing apparatus a discrimination signal corresponding to the periodical interpolating action of the interpolation means. The apparatus is thus arranged to be capable of carrying out a vertical interpolating process on a reproduced video signal and producing a discrimination signal corresponding to the interpolating action. Therefore, in carrying out dubbing, a video signal which has not undergone the interpolation process can be recorded. The arrangement thus permits dubbing with deterioration of picture quality held to a minimal degree.

The above and further objects and novel features of the invention will become apparent from the following description and claims taken in connection with the accompanying drawings.

DETAILED DESCRIPTION OF THE PREFERRED EMBODIMENTS

Figure 3:
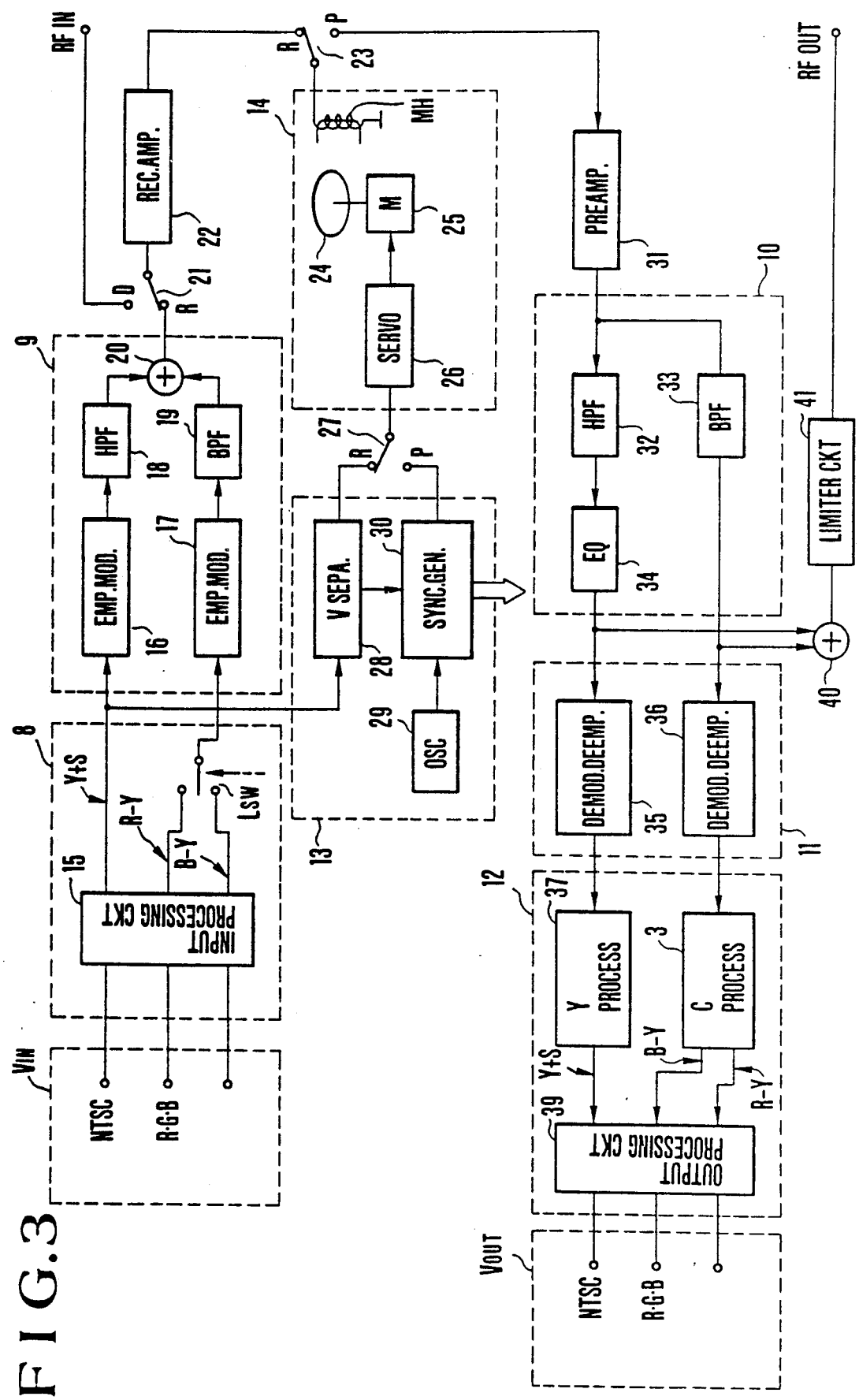
FIG. 3 is a circuit diagram showing a first embodiment of this invention.

Preferred embodiments are arranged as described below with reference to the accompanying drawings:

FIG. 3 shows an SV system including a reproducing apparatus or a dubbing apparatus arranged according to this invention as a first embodiment thereof. The illustration includes an input processing system 8; a recording processing system 9; a first reproduction processing system 10; a second reproduction processing system 11; and output processing system 12; a synchronizing system 13; a magnetic device system 14; a video signal input terminal VIN; and a video signal output terminal VOUT which is serving as an interpolated signal producing means.

In the input processing system 8, an input processing circuit 15 is arranged to perform a waveform treatment process on an NTSC signal or R, G and B signals or the like coming through the input terminal VIN and to convert the incoming signal into color difference signals. The input processing circuit 15 thus produces a luminance signal (Y+S) including a synchronizing signal (S) and color difference signals (R−Y) and (B−Y). The two color difference signals are switched over from one to the other by a line switch LSW and is alternately produced at every horizontal line period in a line sequential manner. The luminance signal (Y+S) which includes the synchronizing signal and the line sequential color difference signals are respectively modulated by modulation circuits 16 and 17. The modulated luminance signal (Y+S) is supplied via a high-pass filter (HPF) 18 to a recording amplifier 22. The modulated line sequential color difference signals come via a bandpass filter (BPF) 19 to be mixed with the modulated luminance signal in a mixer circuit 20. The mixed color signal is supplied via a switch 21 to the recording amplifier 22. The recording amplifier amplifies these input signals. The amplified signals are supplied to a head MH via a switch 23 in a recording mode and then these signals are recorded by the head MH on a disc 24 which is employed as a recording medium. The disc 24 is driven by a motor 25, which is controlled to rotate at a predetermined speed by a servo control circuit 26.

In the recording mode, a switch 27 is connected on the side of a vertical synchronizing signal separating circuit 28. Therefore, the servo control circuit 26 operates on the basis of a synchronizing signal which is produced from the input processing circuit 15 together with the luminance signal.

In recording a dubbing signal, the switch 21 is connected to one side D thereof, where, the incoming dubbing signal is amplified through the recording amplifier 22 to become an optimum recording current before it is recorded.

In a reproducing mode, the switch 23 is connected to another side P thereof to allow the signal of the disc 24 to be guided to a pre-amplifier 31 via the head MH.

The output of the pre-amplifier 31 is supplied to an HPF 32 and a BPF 33, respectively. Then, a luminance signal, which is modulated through the HPF 32, and color difference signals, which are modulated through the BPF 33, are separated.

Following this, the high zone component of the output of the HPF 32 is raised by an equalizer circuit 34 to have the deterioration of the high zone characteristic, which takes place within the magnetic device system 14, compensated thereby.

Figure 1:
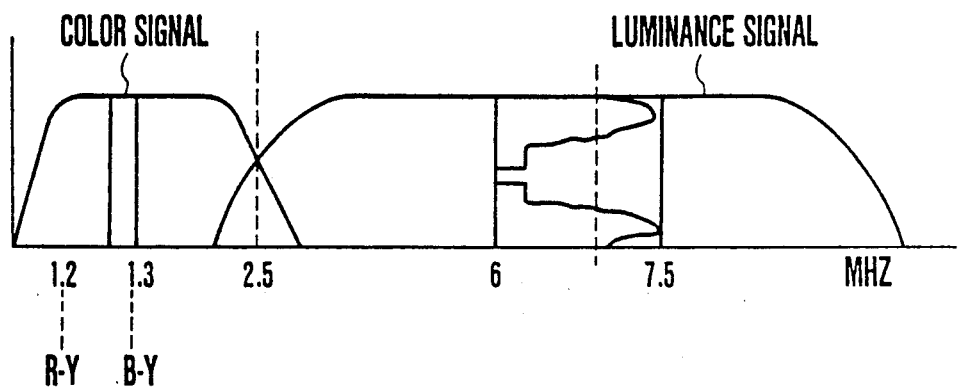
FIG. 1 shows the frequency spectrum of a recording signal obtained in a still picture recording system.
Figure 2A:
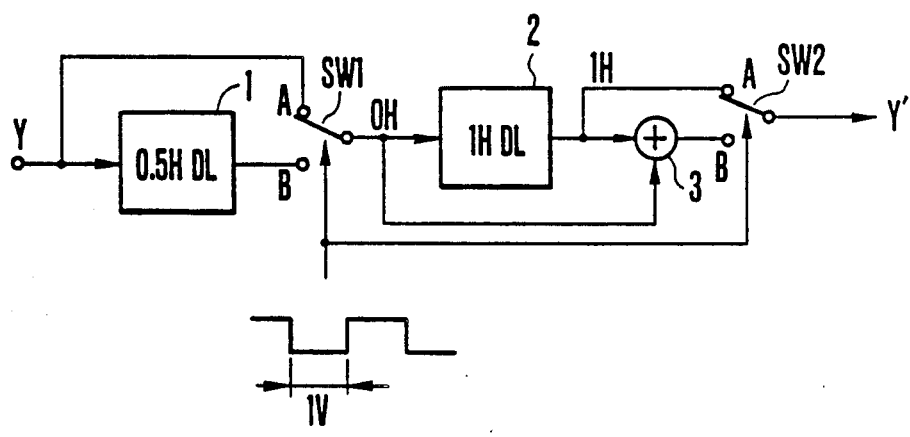
FIG. 2A is a diagram showing, by way of example, the arrangement of a luminance signal interpolation circuit.
Figure 2B:
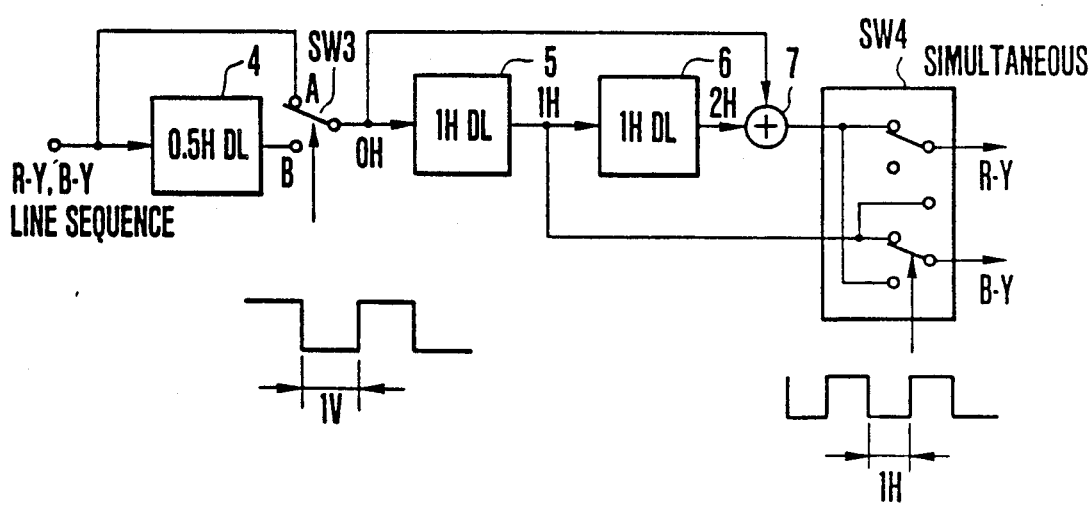
FIG. 2B is a diagram showing, by way of example, the arrangement of a color signal interpolation circuit.

Then, the output of this equalizer circuit 34 and that of the BPF 33 are respectively demodulated by demodulation circuits 35 and 36 to obtain a luminance signal and color difference signals. The outputs of these circuit 35 and 36 are subjected to various waveform treatment processes carried out by Y processing and C processing circuits 37 and 38. After that, they are converted into an NTSC signal or R, G and B signals by an output processing circuit 39 which serves as interpolation means. The output processing circuit 39 includes a luminance signal interpolation circuit and a color signal interpolation circuit which are arranged as shown in FIGS. 2A and 2B. The output processing circuit 39 performs an interpolating operation on the output of the Y signal system to obtain a frame signal from a field signal; and on the output of the C signal system to form concurrent color difference signals from the line sequential color difference signals. The NTSC signal or the R, G and B signals, which have been interpolated by the output processing circuit, are produced through an output terminal VOUT.

Further, in the reproduction mode, the servo control circuit 26 is driven in synchronism with the synchronizing signal which is formed by a synchronizing signal generator 30 on the basis of the output of an oscillator 29.

The output of the equalizer circuit 34 and that of the BPF 33 are, in addition, mixed by a mixer circuit 40. The output of the mixer circuit 40 is supplied to a limiter circuit 41 to have any AM component noise removed there and is then produced as a dubbing signal from an output terminal RFOUT which serves as dubbing signal producing means. The limiter circuit 41 is provided for the purpose of improving any S/N ratio by removing an AM noise, a sliding noise and thermal noise of the magnetic head of the magnetic device system 14 and modulation noise. In this specific embodiment, a recording arrangement is formed by the input terminal VIN, the input processing system 8, the recording processing system 9, the dubbing signal input terminal RFIN, the amplifier 22, the magnetic device system 14, the synchronizing system 13, etc. A reproducing arrangement is formed by the magnetic device system 14, the synchronizing system 13, the amplifier 31, a first reproduction processing system 10, a second reproduction processing system 11, the output processing system 12, the video signal output terminal VOUT, the dubbing signal output terminal RFOUT, etc. The magnetic device system 14 and the synchronizing system 13 are used in common by the recording and reproducing arrangements. All the circuit elements that are shown in FIG. 3 are housed within one and the same casing.

The embodiment is provided with the dubbing signal output means for having the reproduced signal produced as a dubbing signal before the signal is interpolated. Therefore, the signal can be dubbed without deterioration of resolution, etc. Further, in the recording arrangement, there are provided the input terminal RFIN and the switch 21 for the purpose of allowing a modulated signal to be recorded as it is by the magnetic head. Therefore, the modulated signal which is supplied from the reproduction arrangement can be recorded without further modulation.

Figure 4:
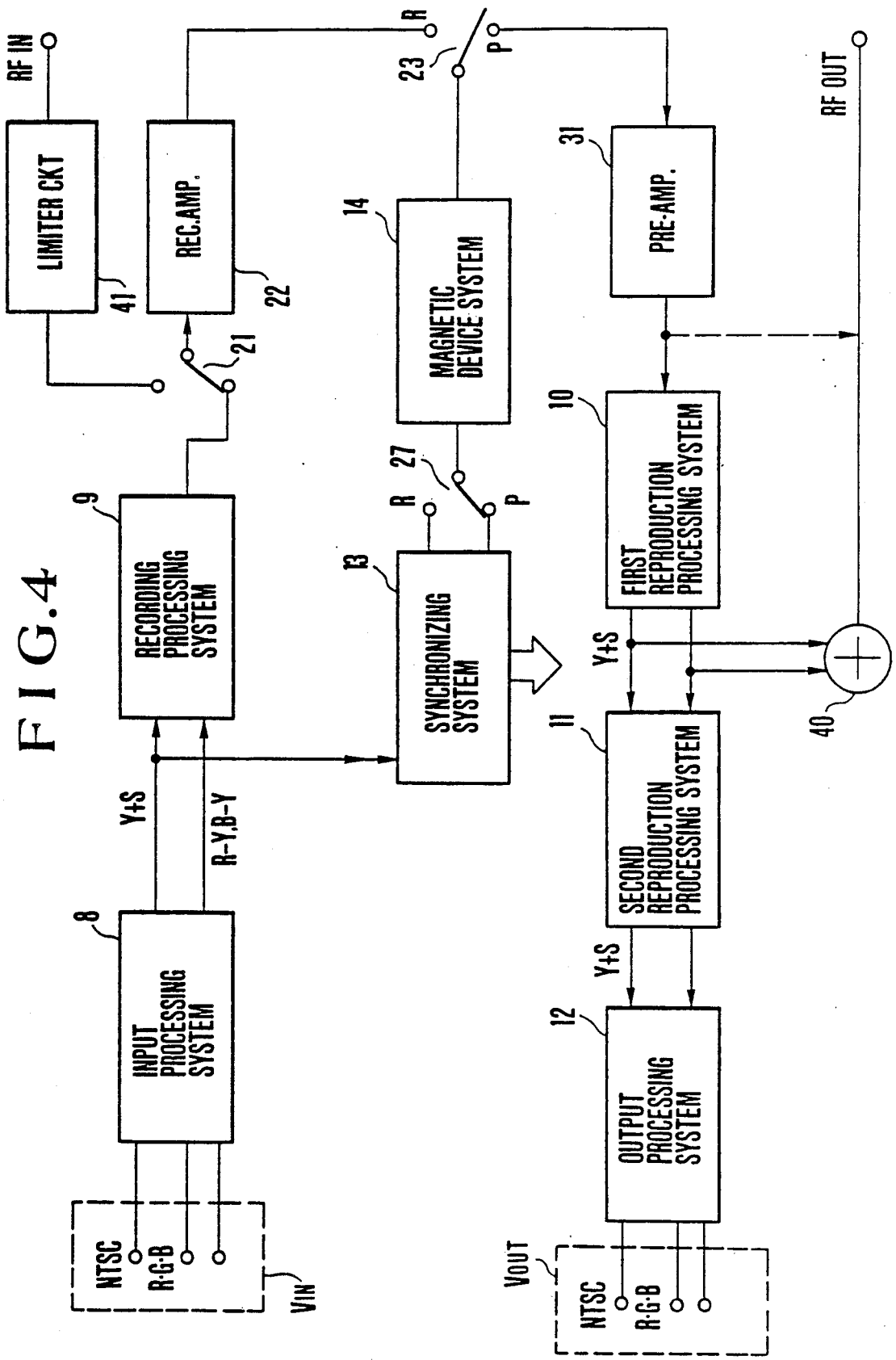
FIG. 4 is a circuit diagram showing a second embodiment of the invention.

FIG. 4 shows a second embodiment of this invention. In this drawing, the same reference numerals are used for denoting the same elements as those shown in FIG. 3. In this case, the limiter circuit 41 is disposed on the input side (RFIN) of the recording arrangement.

In both the first and second embodiments, the output terminal RFOUT may be arranged behind the pre-amplifier 31. In cases where the adverse effect of the AM noise is neglible, the limiter circuit 41 may be omitted.

Figure 5:
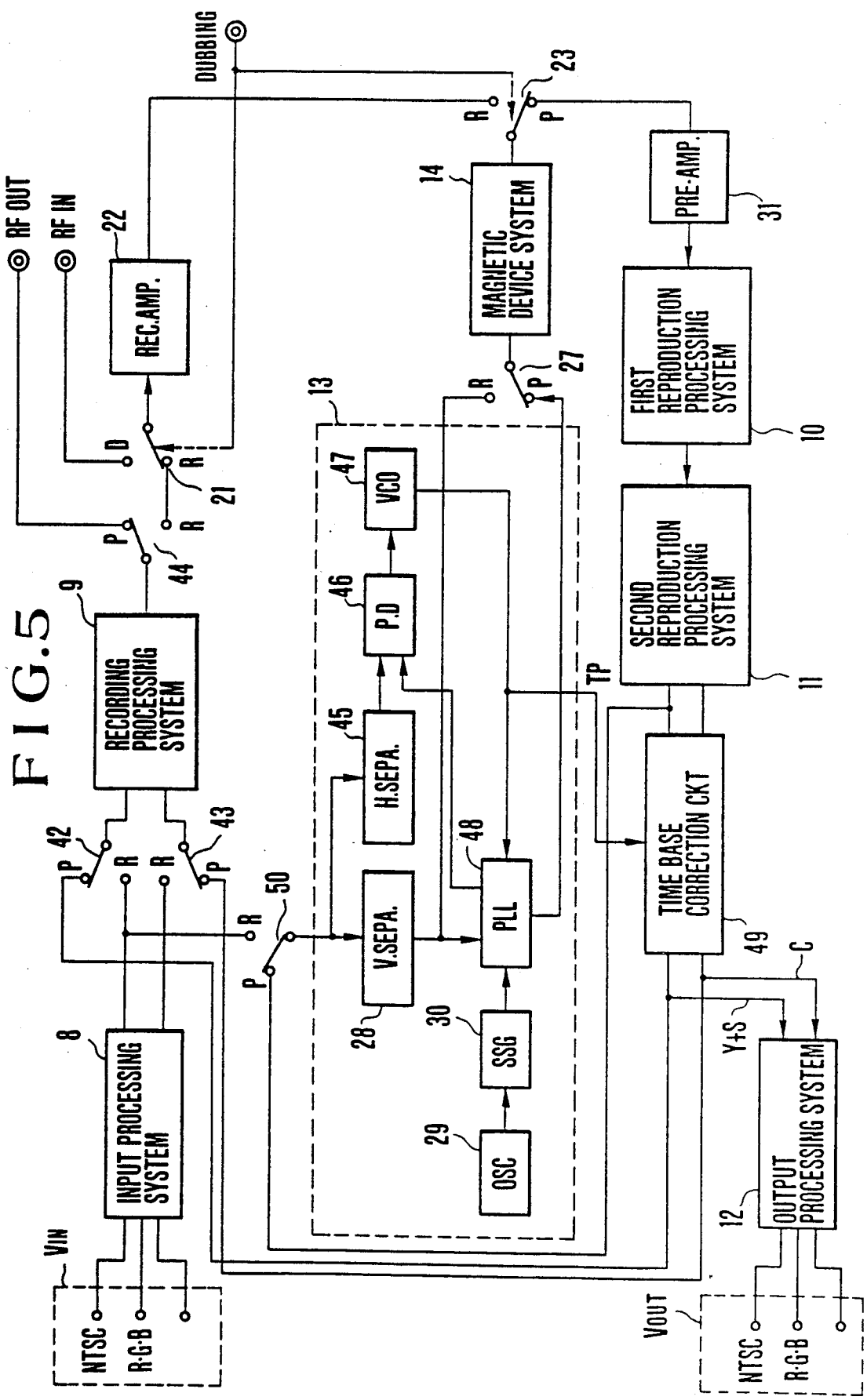
FIG. 5 is a circuit diagram showing a third embodiment of the invention.

FIG. 5 shows a third embodiment of the invention. An RF signal read out by a magnetic device system 14 is demodulated. The demodulated signal is processed to compensate for signal deterioration caused within the magnetic device system 14. After that, the signal is again modulated and is then produced as an RF dubbing signal. The RF dubbing signal thus produced is dubbed on a magnetic disc via an RF input terminal and a pre-amplifier of another recording device. FIG. 5 uses the same reference numerals for denoting the same elements as those shown in FIGS. 1-4. Switches 42–44 and 50 are arranged to be in connection with their sides R in the recording mode and with sides P in the reproduction mode of the embodiment. The embodiment is provided with a horizontal synchronizing signal separating circuit 45; a phase comparison circuit 46, a VCO (voltage-controlled oscillation) circuit 47; a PLL (phase-locked loop) control circuit 48; and a time base correction circuit 49.

The operation for correcting signal deterioration includes the removal of AM noise, correction of modulation frequency characteristic, correction of time base variations, etc. The above-stated time base variation correction is performed, for example, by means of an analog delay line, such as a CCD, etc. More specifically, the demodulated signal (the Y+S signal or the line sequential color difference signals) is arranged to be transferred by the time base correction circuit 49 by means of a pulse signal TP which is modulated to eliminate the time base variations caused by the magnetic device system 14. The CCD driving pulse signal TP is obtained by comparing the phase of a horizontal synchronizing signal separated from the demodulated signal by the circuit 45 with a reference horizontal synchronizing signal obtained from the synchronizing signal generation circuit 30 to obtain a time base variation error signal and then by controlling the VCO circuit 47 in such a way as to cause the value of this error signal to become zero.

In the reproduction mode of this embodiment, a video signal which is once demodulated is compensated for signal deterioration by the second reproduction processing system 11. The signal is then again modulated by the recording processing system 9 which includes the modulation circuit disposed on the recording arrangement side. The signal which is thus modulated again is produced as a dubbing signal from the output terminal RFOUT.

The signal processing arrangement mentioned above ensures that an RF signal most suited for dubbing can be obtained with signal deterioration compensated.

Further, while this specific embodiment is arranged to perform signal processing for signal deterioration compensation on the side of the RF signal output terminal RFOUT, it may be arranged to be carried out on the side of the RF signal input terminal RFIN instead of the output side. Further, in this embodiment, in modulating the output of the time base correction circuit 49, the recording processing system which is disposed within the dubbing arrangement is utilized. However, a modulation circuit may be separately arranged for that purpose. Further, the modulation is arranged to be carried out before the dubbing signal is produced from the output terminal RFOUT. However, this arrangement may be replaced with a different arrangement wherein the modulation is not carried out when the dubbing signal is produced but is carried out after the dubbing signal is supplied from the input terminal RFIN.

Figure 6:
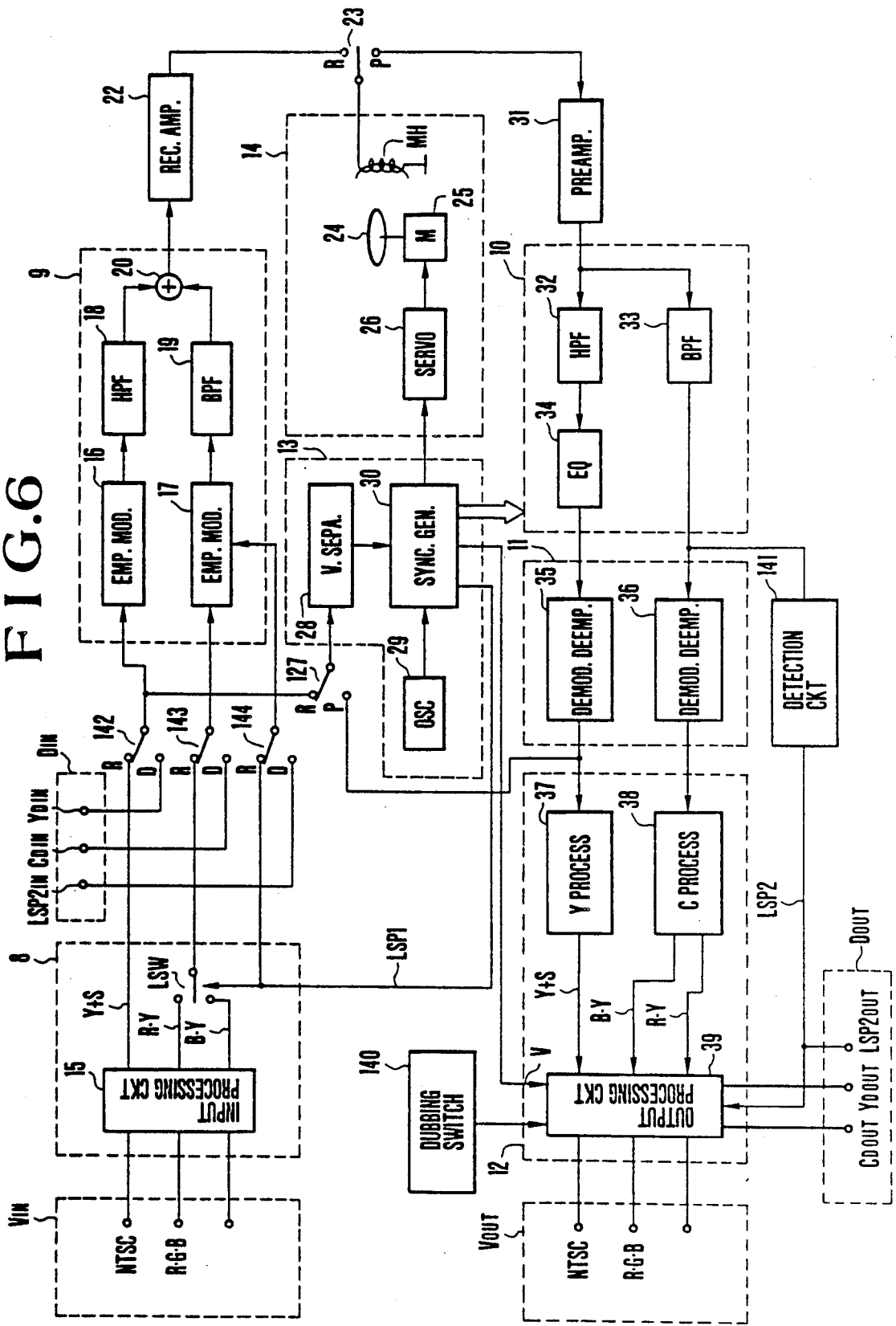
FIG. 6 is a circuit diagram showing a fourth embodiment of the invention.

FIG. 6 shows a fourth embodiment of the invention. This drawing uses the same reference numerals for denoting the same elements as those shown in other drawings FIGS. 1 to 5. This embodiment is arranged to have the luminance signal (Y+S) which includes the synchronizing signal and the line sequential color difference signals, respectively, frequency modulated by modulation circuits 16 and 17 through switches 42 and 143. In the recording mode of the embodiment, the switch 27 is connected to the side R thereof. Then, there takes place a genlock of the synchronizing signal generation circuit 30 via the vertical synchronizing signal separation circuit 28 on the basis of a synchronizing signal produced from the input processing circuit 15 together with the luminance signal. Then, the servo control circuit 26 is caused to operate by a synchronizing signal coming from the circuit 30. Meanwhile, the synchronizing signal generation circuit 30 is producing a pulse signal LSP1 which shifts the position of the switch LSW at the end of every H (horizontal period).

When the positions of switches 127, 23, etc., are shifted to their sides P, the genlock is applied to the synchronizing signal generation circuit 30 for synchronization with the vertical synchronizing signal included in the reproduced signal. Further, in the reproduction mode, the output of a BPF 33 is guided to a detection circuit 141 for discrimination between signals (R−Y) and (B−Y). In other words, the carrier frequency of the signal (R−Y) and that of the signal (B−Y) differ from each other. Therefore, the two can be discriminated from each other by detecting the frequency component of each carrier.

The detection output thus obtained is arranged to be produced at a high level, for example, for an H period during which the signal (R−Y) is superimposed and at a low level for another H period during which the signal (B−Y) is produced. The detection circuit 141 thus produces a pulse signal LSP2 the level of which thus changes between a high level and a low level at the end of every H period as a discrimination signal (see FIG. 8B).

When the position of a dubbing switch 140 is shifted to a dubbing position, an interpolation process at the output processing circuit 39 comes to a stop. Then, a luminance signal and line sequential color-difference signals which are not interpolated are produced as dubbing signals and supplied via the output processing circuit to the output terminal DOUT, which is arranged as a part of dubbing signal producing means to produce the dubbing signals. The dubbing signal producing means consists of the circuits 35 to 39 and the output terminal DOUT.

Figure 7:
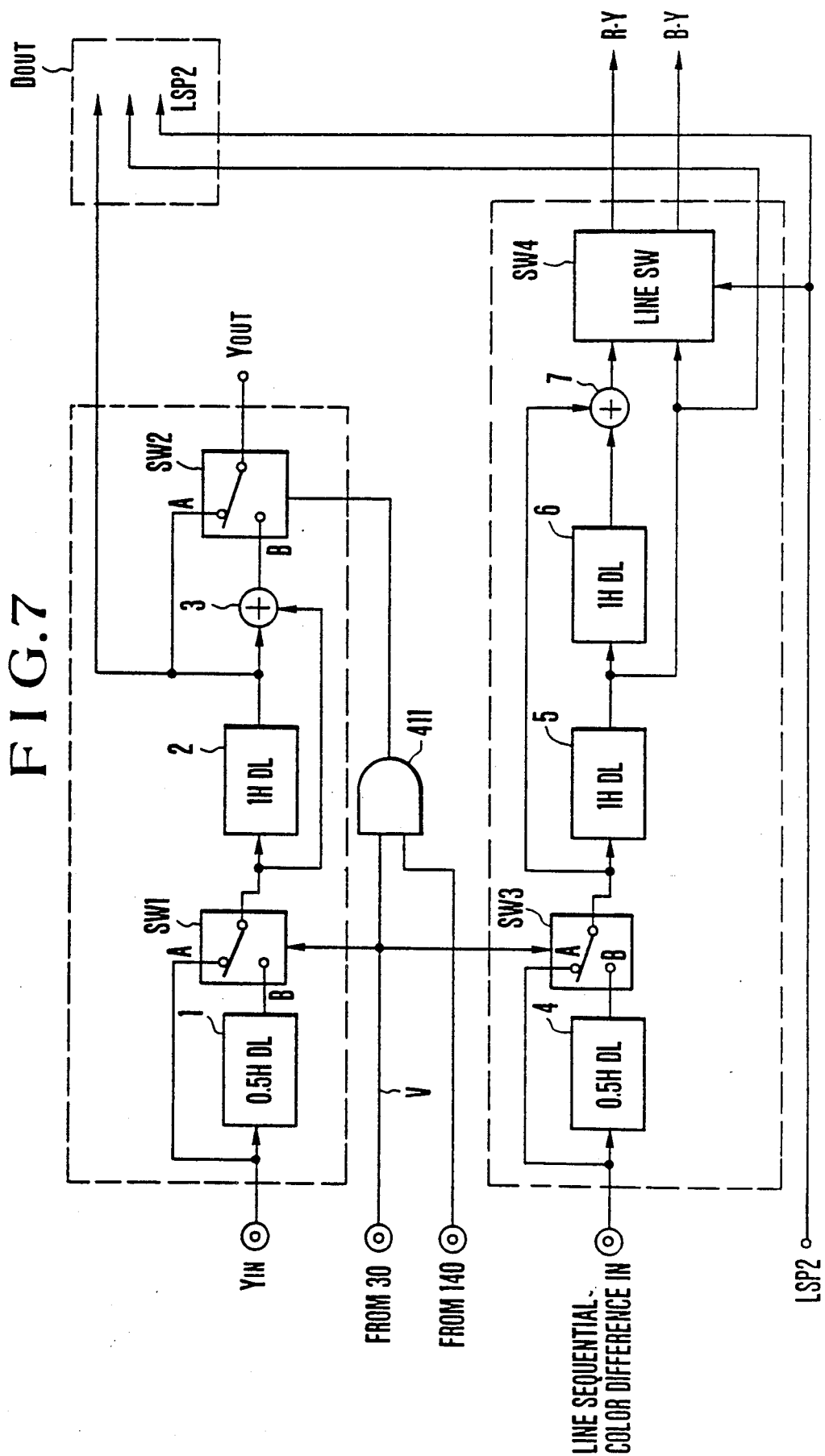
FIG. 7 is a circuit diagram showing the essential parts of an output processing circuit.

FIG. 7 shows, by way of example, the arrangement of the essential parts of the above-stated output processing circuit. The same reference numerals are used in the drawing for denoting the same elements as those shown in FIGS. 2A and 2B.

Figures 8A, 8B, 8C:
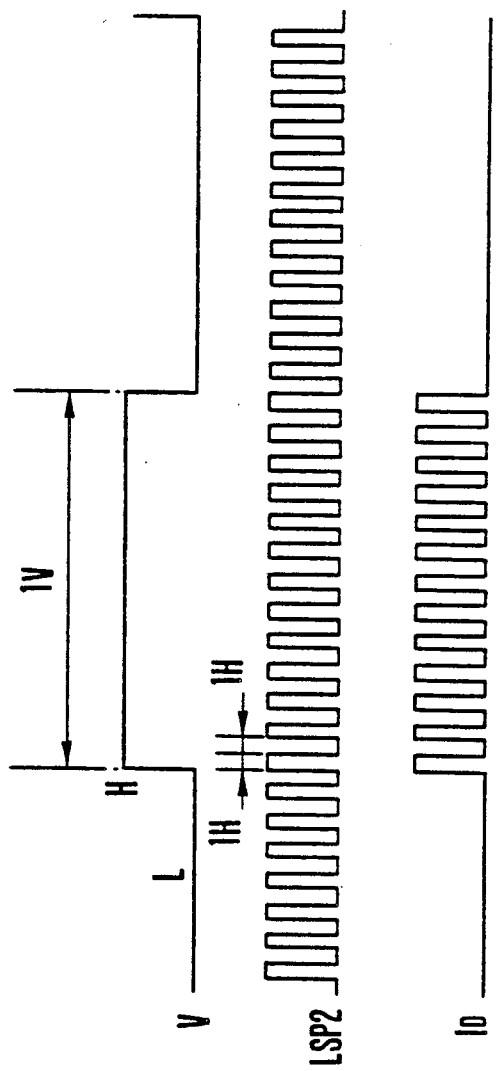
FIGS. 8A, 8B and 8C are waveform charts showing the waveforms of different discrimination signals.

In the case of this example, the synchronizing signal generation circuit 30 supplies switches SW1 and SW3 and an AND gate 411 with a pulse signal V which is inverted as a discrimination signal in synchronism with a vertical synchronizing signal for every field as shown in FIG. 8A. Meanwhile, a signal from a dubbing switch 140 is arranged to be supplied to the AND gate 411. Further, from the detection circuit 141, the pulse signal LSP2 which is inverted for every H period (horizontal period) as shown in FIG. 8B is supplied to a switch SW4. The pulse signal LSP2 is arranged to be produced together with the dubbing signal from a discrimination signal output terminal LSP2-OUT which is arranged within the output terminal DOUT. When the dubbing switch 140 is not positioned on the dubbing side, the switch 140 produces a high level signal and the AND gate 411 is open. In this instance, the positions of the switches SW1, SW2 and SW3 are shifted to opposite positions at the end of every field.

For example, for the first field, the switches SW1 to SW3 are in connection with their sides A. Then, the luminance signal is produced after it has been delayed as much as one H period. Further, for this field, the color difference signals are obtained with their original signals and their interpolated signals alternately switched over at the end of every H period. For the second field, the positions of the switches SW1 to SW3 are shifted to their sides B. The luminance signal is then delayed as much as 0.5 H period and is skew compensated. In addition to that, vertical interpolation is carried out using the original signal and the signal which has been delayed by one H period. Further, the color difference signals are also skew compensated.

Meanwhile, when the position of the dubbing switch 140 is shifted to its dubbing side, a low level signal is produced from the switch to close and AND gate 411. This causes the switch SW2 to open. As a result of that, the same filed signal is produced from the dubbing signal output terminal DOUT for both the first and second fields.

Further, since each of the line sequential color difference signals is arranged to always have the output of the 1 H delay circuit 5 which is obtained prior to the interpolation process guided to the terminal DOUT, the delayed original signal is produced. In the embodiment described, the pulse signal LSP2 is arranged to be produced from the output terminal DOUT. This arrangement enables the discrimination of the line sequential color difference signals (R−Y) and (B−Y) to be simply accomplished on the side of the dubbing arrangement.

The dubbing signal can be supplied from the dubbing signal input terminal DIN which is disposed on the side of the recording arrangement. In the case of dubbing recording, switches 142 to 144 are shifted to their sides D to allow the dubbing luminance signal YD and the dubbing line sequential color difference signals CD to be supplied to the modulation circuits 16 and 17, respectively.

Further, the pulse signal LSP2 is arranged to switch over the carrier frequency to be used at the modulation circuit 17 according to the signal (R−Y) or (B−Y).

While a special dubbing signal output terminal DOUT is arranged in this specific example, this arrangement may be replaced with arrangement to use the video signal output terminal VOUT also for that purpose. The recording arrangement and the reproducing arrangement of course may be arranged separately.

The embodiment described is provided with the dubbing signal producing means which is arranged to demodulate the reproduced line sequential color difference signals and to produce the demodulated signals as dubbing signals; and the discrimination signal producing means which is arranged to form and produce a discrimination signal corresponding to each of the color difference signals. In dubbing the demodulated line sequential color difference signals, therefore, each of the color difference signals can be discriminated from the other for dubbing. The arrangement therefore precludes the possibility of misplacing the color difference signals or having the interpolated color difference signals dubbed by mistake.

Figure 9:
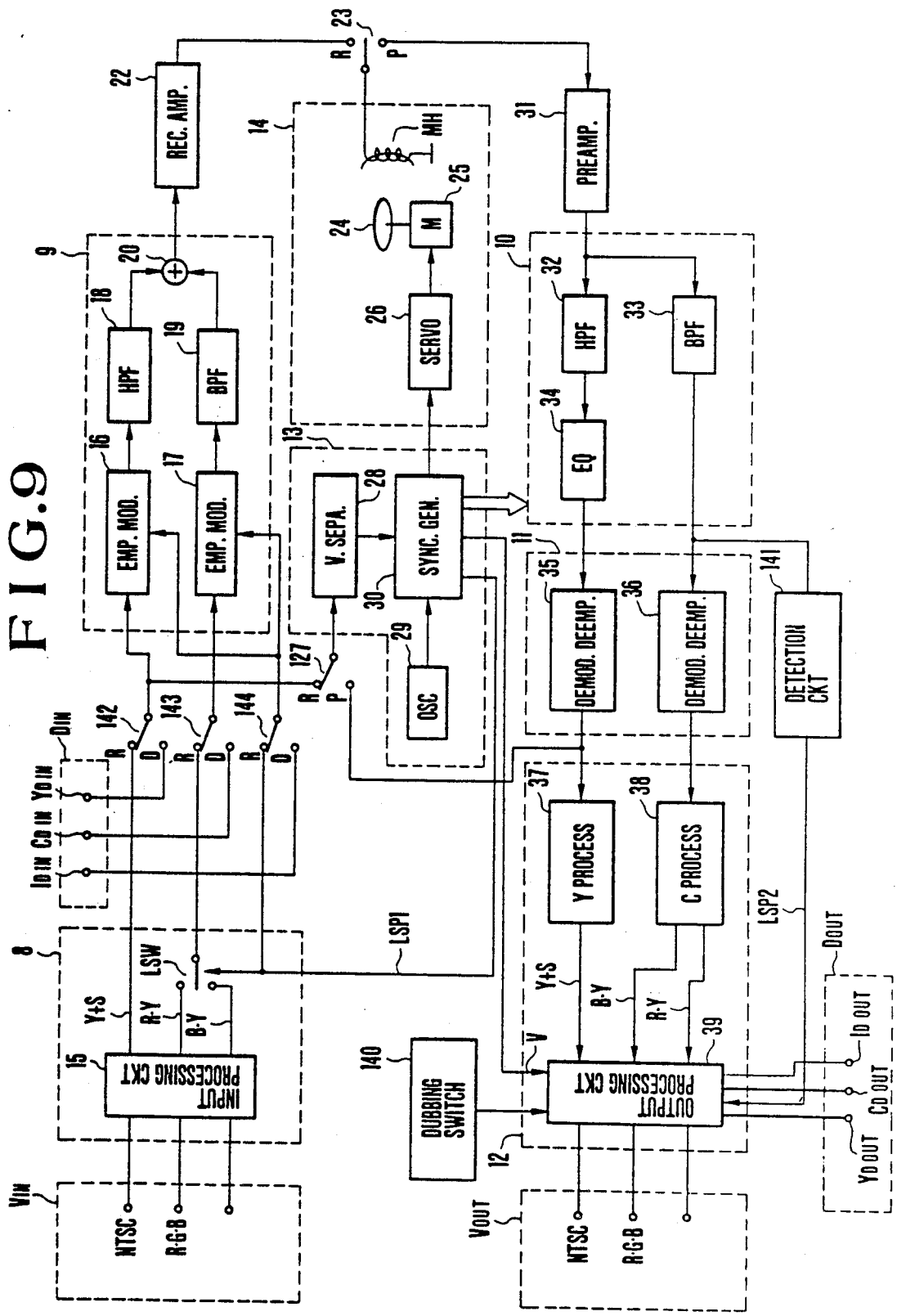
FIG. 9 is a circuit diagram showing a fifth embodiment of this invention.

FIG. 9 shows a fifth embodiment of the invention. In this case, a reproducing apparatus according to the invention is arranged to ensure high quality dubbing even when dubbing is performed with signals obtained after interpolating the luminance signal, etc. For that purpose, a discrimination signal ID which discriminates one field for which vertical interpolation is performed from another field for which the original signal is produced without interpolation is arranged to be produced together with the dubbing video signal. This arrangement makes it possible to selectively dub only the signals which have not undergone the vertical interpolation process among the video signals produced from the reproducing arrangement. FIG. 9 uses the same reference numerals for denoting the same elements as those shown in other drawings, FIGS. 1 to 8.

The discrimination signal ID which is shown in FIG. 8C is formed by taking the AND of the signal V of FIG. 8A and the signal LSP2 of FIG. 8B. This signal ID is produced from a terminal IDOUT which serves as discrimination signal output means within the dubbing signal output terminal DOUT.

Further, this discrimination signal ID is arranged to be supplied via a switch 144 to the modulation circuit 16 art the time of dubbing. The modulation is carried out only when the signal ID is at a high level. Accordingly, the signal which has been vertically interpolated is never recorded.

The signal ID is arranged to be the AND signal of the signals V and LSP2 for the purpose of reducing the number of terminals. However, where an increase in the number of terminals presents no problem, these signals may be arranged to be produced from separate terminals.

What is claimed is:

1. A reproducing apparatus in a system in which luminance signals are converted by a first conversion process into converted luminance signals, while color information signals are converted by a second conversion process into converted color information signals, both types of signals being multiplexed to form recording signals, which are recorded on a record bearing medium, said reproducing apparatus being arranged to reproduce said recording signals from said record bearing medium, to restore said luminance signals and to separately output the luminance signals and the color information signals, said reproducing apparatus comprising:

a reproducing head for reproducing said recording signals from said record bearing medium;

separating means for separating said converted luminance signals and said converted color information signals from said recording signals reproduced by said reproducing head;

first inverse-conversion processing means for applying a first inverse-conversion process inverse to said first conversion process to said converted luminance signals separated by said separating means, so as to form said luminance signals;

second inverse-conversion processing means for applying a second inverse-conversion process inverse to said second conversion process to said converted color information signals separated by said separating means so as to form said color information signals;

color video signal forming means for forming color video signals by using said luminance signals formed by said first inverse-conversion processing means and said color information signals formed by said second inverse-conversion processing means;

a first output terminal for outputting said luminance signals formed by said first inverse-conversion processing means to other external devices;

a second output terminal for outputting said color information signals formed by said second inverse-conversion processing means to said other external devices; and a third output terminal for feeding to the outside of the apparatus said color video signals formed by said color video signal forming means.

2. An apparatus according to claim 1, wherein said converted luminance signals include modulated luminance signals.

3. An apparatus according to claim 2, wherein said first inverse-conversion processing means includes a first demodulating circuit for demodulating said modulated luminance signals into the chrominance signals.

4. An apparatus according to claim 1, wherein said converted color information signals include modulated color information signals.

5. An apparatus according to claim 2, wherein said second inverse-conversion processing means includes a second demodulating circuit for demodulating said modulated color information signals into said color information signals.

6. An apparatus according to claim 1, wherein said converted luminance signals include frequency modulated luminance signals.

7. An apparatus according to claim 6, wherein said first inverse-conversion processing means includes a first frequency demodulating circuit for demodulating said frequency modulated luminance signals into said luminance signals.

8. An apparatus according to claim 1, wherein said converted color information signals include frequency modulated color information signals.

9. An apparatus according to claim 8, wherein said second inverse-conversion processing means includes a second frequency demodulating circuit for demodulating said frequency modulated color information signals into said color information signals.

10. A reproducing apparatus in a system in which luminance signals are converted by a first conversion process into converted luminance signals, while color information signals consisting of two kinds of color difference signals are converted by a second conversion process into converted color information signals, both said types of signals being multiplexed to form recording signals which are recorded on a record bearing medium, said reproducing apparatus being arranged to reproduce said recording signals from said record bearing medium, to restore said luminance signals and said color information signals from the reproduced recording signals and to separately output said luminance signals and said color information signals, said reproducing apparatus comprising:

a reproducing head for reproducing said recording signals from said record bearing medium;

separating means for separating said converted luminance signals and said converted color information signals from said recording signals reproduced by said reproducing head;

first inverse-conversion processing means for applying a first inverse-conversion process inverse to said first conversion process to said converted luminance signals separated by said separating means so as to form said luminance signals;

color video signal forming means for forming color video signals by using said luminance signals formed by said first inverse-conversion processing means and said color information signals formed by said second inverse-conversion processing means;

a first output terminal for outputting said luminance signals formed by said first inverse-conversion processing means to other external devices;

a second output terminal for outputting said color information signals formed by said second inverse-conversion processing means to said external devices; and a third output terminal for feeding to the outside of the apparatus said color video signals formed by said color video signal forming means.

11. An apparatus according to claim 10, wherein said color information signals include line sequential color difference signals.

12. An apparatus according to claim 11, wherein said color video signal forming means includes coincidence means for effecting coincidence of the line sequential color difference signals formed by said second conversion means and outputting two kinds of color difference signals.

13. An apparatus according to claim 12, wherein said color video signal forming means is arranged to form composite color television signals by using the luminance signals formed by said first conversion processing means and the two kinds of color difference signals outputted from said coincidence means.

14. An apparatus according to claim 12, wherein said color video signal forming means is arranged to form R.G.B. signals by using the luminance signals formed by said first conversion processing means and the two kinds of color difference signals outputted from said coincidence means.

15. A color video signal recording apparatus for recording a color video signal on a recording medium, comprising:
(a) a first input terminal for inputting luminance signals outputted from other external devices;
(b) a second input terminal for inputting color information signals outputted form the other external devices;
(c) first conversion processing means for effecting a first conversion process of said luminance signals inputted from said first input terminal to form converted luminance signals, and outputting said converted luminance signals;
(d) second conversion processing means for effecting a second conversion process of said color information signals inputted form said second input terminal to form converted color information signals and outputting said converted color information signals; and
(e) recording means for recording on a recording medium said converted luminance signals outputted from said first conversion processing means and said converted color information signals outputted from said second conversion processing means.

16. A color video signal recording apparatus according to claim 15, wherein the color video signal for one frame is constituted by the color video signal for two fields.

17. A color video signal recording apparatus according to claim 16, wherein said recording means is arranged to multiplex the converted luminance signal for one field outputted form said first conversion processing means and the converted color information signal for one field outputted from said second conversion processing means and to record the multiplexed signal on one track of the recording medium.

18. A color video signal recording apparatus according to claim 15, wherein said first conversion processing means includes first frequency modulating means which frequency modulates the luminance signal received through said first input terminal and outputs the frequency modulated luminance signal.

19. A color video signal recording apparatus according to claim 18, wherein said second conversion processing means includes second frequency modulating means which frequency modulates the color information signal received through said second input terminal and outputs the frequency modulated color information signal.

20. A color video signal recording apparatus according to claim 19, wherein said recording means includes frequency multiplexing means for multiplexing the frequency modulated luminance signal outputted from said first frequency modulating means and the frequency modulated color information signal outputted from said second frequency modulating means.

21. A color video signal recording apparatus according to claim 15, wherein said color information signal includes a color-difference line sequential signal.

22. A color video signal recording apparatus for recording a color video signal on a recording medium, comprising:
(a) a first input terminal for inputting luminance signals from outside;

(b) a second input terminal for inputting color information signals from outside;

(c) a third input terminal for inputting color video signals from outside;

(d) signal forming means for forming the luminance and the color information signals using said color video signals inputted from said third input terminal and outputting the luminance and color information signals;

(e) selective output means for selectively outputting one of said luminance and color information signals inputted from said first and second terminals, and said luminance and color information signals inputted from said signal forming means;

(f) first conversion processing means for effecting a first conversion process of said luminance signals outputted from said selective output means to form converted luminance signals and outputting the converted luminance signals;

(g) second conversion processing means for effecting a second conversion process of said color information signals outputted from said selective output means to form converted color information signals and outputting the converted color information signals; and (h) recording means for recording on a recording medium said converted luminance signals outputted from said first conversion processing means and said converted color information signals outputted from said second conversion processing means.

23. A color video signal recording apparatus according to claim 22, wherein the color video signal for one frame is constituted by the color video signal for two fields.

24. A color video signal recording apparatus according to claim 23, wherein said recording means is arranged to multiplex the converted luminance signal for one field outputted from said first conversion processing means and the converted color information signal for one field outputted from said second conversion processing means and to recording the multiplexed signal on one track of the recording medium.

25. A color video signal recording apparatus according to claim 22, wherein said first conversion processing means includes first frequency modulating means which frequency modulates the luminance signal received through said selective output means and outputs the frequency modulated luminance signal.

26. A color video signal recording apparatus according to claim 25, wherein said second conversion processing means includes second frequency modulating means which frequency modulates the color information signal received through said selective output means and outputs the frequency modulated color information signals.

27. A color video signal recording apparatus according to claim 26, wherein said recording means includes frequency multiplexing means for multiplexing the frequency modulated luminance signal outputted from said first frequency modulating means and the frequency modulated color information signal outputted from said second frequency modulating means.

28. A color video signal recording apparatus according to claim 22, wherein said color information signal includes a color-difference line sequential signal.

* * * * *

UNITED STATES PATENT AND TRADEMARK OFFICE
CERTIFICATE OF CORRECTION

PATENT NO. : 5,003,403

DATED : March 26, 1991

INVENTOR(S) : Seiji Hashimoto et al

It is certified that error appears in the above-identified patent and that said Letters Patent is hereby corrected as shown below:

Title page, inventors should read as follows:
[75] Inventors: Seiji Hashimoto, Kanagawa;
Tsuguhide Sakata, Tokyo,
Akihiko Tojo, Kanagawa,
all of Japan Signed and Sealed this Twentieth Day of October, 1992

*Attest:*

DOUGLAS B. COMER

*Attesting Officer*     *Acting Commissioner of Patents and Trademarks*